United States Patent [19]

Milsap, III

[11] Patent Number: 5,205,225

[45] Date of Patent: Apr. 27, 1993

[54] APPARATUS FOR ALLOWING THERMAL DIMENSIONAL CHANGES OF METAL PARTS IN A RETORT MECHANISM

[75] Inventor: Isaac H. Milsap, III, Memphis, Tenn.

[73] Assignee: Covenant Environmental Technologies, Inc., Memphis, Tenn.

[21] Appl. No.: 917,186

[22] Filed: Jul. 22, 1992

[51] Int. Cl.⁵ ............................................... F23B 3/00
[52] U.S. Cl. ..................................... 110/240; 48/119; 110/110; 110/229; 432/112
[58] Field of Search ............... 110/110, 229, 226, 246, 110/240; 48/119, 126; 432/107, 112

[56] References Cited

U.S. PATENT DOCUMENTS

| | | |
|---|---|---|
| 3,682,115 | 8/1972 | Rodgers . |
| 4,025,297 | 5/1977 | Smith et al. ........................ 432/112 |
| 4,235,676 | 11/1980 | Chambers . |
| 4,259,060 | 3/1981 | Kurzeb ........................ 432/112 X |
| 4,308,103 | 12/1981 | Rotter . |
| 4,361,100 | 11/1982 | Hinger ........................ 110/110 X |
| 4,715,965 | 12/1987 | Sigerson et al. . |
| 4,730,564 | 3/1988 | Abboud . |
| 4,738,206 | 4/1988 | Noland . |
| 4,759,300 | 7/1988 | Hansen et al. ........................ 110/229 |
| 4,784,603 | 11/1988 | Robak, Jr. et al. . |
| 4,789,332 | 12/1988 | Ramsey et al. . |
| 4,821,653 | 4/1989 | Jones . |
| 4,881,475 | 11/1989 | DeLeur . |
| 4,974,528 | 12/1990 | Barcell . |
| 4,977,839 | 12/1990 | Fochman et al. . |

Primary Examiner—Edward G. Favors
Attorney, Agent, or Firm—Stanley P. Fisher

[57] ABSTRACT

Apparatus for allowing thermal dimensional changes of metal parts in a retort mechanism including, a retort chamber, a retort pipe axially extending within the retort chamber and having a material inlet and outlet portion, a retort auger axially extending from the inlet portion to the outlet portion of the retort pipe, the retort pipe having an outer end wall at the inlet end thereof, the retort auger being fixed to the outer end wall so as to be rotatable within the retort pipe, the retort pipe, retort auger and outer end wall being mounted so as to be axially slidable within the retort chamber in response to thermal expansion, and a circumferential seal mounted on the retort chamber and in contact with the retort pipe so as to maintain a sealing relationship during axial sliding.

8 Claims, 7 Drawing Sheets

APPARATUS FOR ALLOWING THERMAL DIMENSIONAL CHANGES OF METAL PARTS IN A RETORT MECHANISM

BACKGROUND OF THE INVENTION

1. Cross-Reference to Related Applications

This application is a related to U.S. patent application Ser. No. 07/917,199, filed Jul. 22, 1992, entitled: "METHOD FOR RETORTING ORGANIC MATTER", which is a CIP of U.S. patent application Ser. No. 07/820,134, filed Jan. 13, 1992, entitled: "METHOD FOR RETORTING ORGANIC MATTER", and is also related to U.S. patent application Ser. No. 07/917,191, filed Jul. 22, 1992, entitled: "APPARATUS FOR RETORTING ORGANIC MATTER".

2. Field of the Invention

The present invention relates generally to an apparatus for allowing thermal dimensional changes of metal parts in a retort mechanism, and more particularly to an apparatus which allows radial and axial dimensional changes of a retort auger and associated equipment during the heating and cooling stages of a retort mechanism while maintaining a sealed relationship with a retort chamber.

3. Description of Prior Art

In the past, there have been many methods and apparatus for disposing of or treating waste materials and contaminated materials for recycling. Procedures have been utilized in the past for cleaning up contaminated materials and for recycling materials containing hydrocarbons. Such prior methods have included chemically treating the materials, burning the materials, disposing of the materials in landfills, and retorting the materials under high temperatures. Some examples of prior methods and apparatus as disclosed in the prior art are described as follows.

U.S. Pat. No. 3,682,115 to Rodgers, issued Aug. 8, 1972, discloses a portable disposal apparatus for combustible waste in which the combustible waste is crushed and chopped and conveyed to a combustion chamber where it is ignited with an auxiliary fuel and burned. Products of combustion which have not been fully consumed are condensed in condenser tanks. Unburned gases are then directed back into the combustion chamber to sustain combustion while residual tars, oils, and condensed liquids are removed from the condenser tanks from time to time.

U.S. Pat. No. 4,235,676 to Chambers, issued Nov. 25, 1980, discloses an apparatus including an elongated tube that is maintained at a temperature of about 1100 degrees Fahrenheit and through which organic waste material, such as shredded rubber automobile tires or industrial plastic waste or residential trash which preferably has metal and inorganic matter removed therefrom, is moved at a uniform rate of speed in the absence of air and/or oxygen. The vapors and gases which are produced and/or liberated within the tube are quickly removed therefrom by means of a vacuum of from about four inches to about six inches of mercury, with the vapors being condensed and the gases separated therefrom.

U.S. Pat. No. 4,308,103 to Rotter, issued Dec. 29, 1981, discloses a system including a cylindrical, horizontally disposed reactor vessel having a material conveying device including a plurality of paddle-like impellers mounted on a rotatable pipe for transporting comminuted solid carbonizable materials, such as coal, shredded scrap tires, comminuted municipal waste, sawdust and wood shavings, and the like, through the reactor vessel; a heating chamber arranged coaxially around the reactor vessel to subject the material passing through the reactor vessel to an indirect heat transfer relationship with a burning air-fuel mixture spirally swirling within the heating chamber and moving in a direction generally countercurrent to the material passing through the reaction vessel with the burning air-fuel mixture and combusted gases being progressively constricted and confined by the heating chamber. One end of the reaction vessel has a feed material inlet. Communicating with the feed material inlet is a gravity packed feed material column which assists in effectively sealing the feed material inlet from oxygen-containing gases. A rotary air lock is located near the upper end of the feed material column to further assure the exclusion of oxygen-containing gases from the interior of the reaction vessel. A side inlet may be provided in the feed material column for introducing inert gas to such column to further seal the system against oxygen-containing gases. The other end of the reaction vessel has a solid residue outlet and a gas-vapor outlet. Communicating with the solid residue outlet is a gravity packed column which contributes to the sealing at the outlet end of the reaction vessel from oxygen-containing gases. The comminuted solid carbonizable material passing through the reactor vessel is converted by pyrolysis, or high-temperature destructive distillation, into combustible gases, liquid hydrocarbons and solid carbonaceous residues. Gases and vaporized liquids generated from the solid carbonizable material introduced into the reaction vessel leave the reaction vessel through the gas-vapor outlet and are withdrawn under a slightly negative pressure and in a manner so as to avoid the entrance of any oxygen-containing gases into the reaction vessel.

U.S. Pat. No. 4,715,965 to Sigerson et al., issued Dec. 29, 1987, discloses a method for separating volatilizable contaminants from soil by introducing the soil into a rotary aggregate dryer through which a working gas indirectly heated to between 750 and 1800 degrees Fahrenheit is drawn to vaporize the contaminants, and for recovering the contaminants for disposal or for cooling the effluent to condense and precipitate out a substantial portion of the contaminants and passing the effluent through activated carbon.

U.S. Pat. No. 4,730,564 to Abboud, issued Mar. 15, 1988, discloses a multi-stage rotary kiln for burning waste and including a pair of concentric tubes affixed one inside the other with waste being conveyed through the inner tube and with hot burning gases being introduced into the inner tube to cause the waste to burn.

U S. Pat. No. 4,821,653 to Jones, issued Apr. 18, 1989, discloses an apparatus for detoxifying heavy metals and the like contained in sludges, soils, incinerated ashes and similar materials by passing the metal-containing material through a pyrolyzer means operated with a substantially oxygen-free environment.

U.S. Pat. No. 4,974,528 to Barcell, issued Dec. 4, 1990, discloses a method for removing hydrocarbon contaminants from soil by advancing the soil through a dryer having a combustion chamber therein, and exposing the soil to a gaseous flame in the combustion chamber to volatilize certain of the contaminants in the soil.

The patents to Rodgers, Abboud and Barcell teach direct contact between a flame and the material being treated.

The patents to Chambers and Jones teach an anaerobic treatment.

The patent to Sigerson et al. teaches drawing a hot working gas stream at a temperature of between 750 degrees Fahrenheit and 1800 degrees Fahrenheit through the soil by an induced draft fan.

The patent to Rotter teaches moving a spiralling high temperature heating medium within the heating zone toward the material inlet end of the reaction pipe.

SUMMARY OF THE INVENTION

It is therefore an object of the present invention to provide an apparatus which allows for thermal dimensional changes of metal parts in a retort mechanism during the heating and cooling stages.

A further object of this invention is to provide an apparatus for allowing thermal dimensional changes in the radial and axial direction of metal parts in a retort mechanism while maintaining a sealed oxygen-free environment in a retort chamber.

It is a further object of this invention to provide apparatus for allowing thermal dimensional changes of a retort auger and associated equipment in a retort mechanism while maintaining a sealed oxygen-free environment in a retort chamber.

A further object of this invention is to provide apparatus for allowing thermal dimensional changes of a retort auger in a heated retort chamber in such a manner that the associated feed equipment for the retort chamber is capable of axial movement associated with expansion of the retort auger.

A further object of this invention is to provide apparatus for allowing thermal dimensional changes of metal parts in a retort mechanism in a system which is highly mobile and completely self-contained.

BRIEF DESCRIPTION OF THE DRAWINGS

The invention will be further described in conjunction with the accompanying drawings, in which.

DETAILED DESCRIPTION OF THE PREFERRED EMBODIMENT

Figure 1:
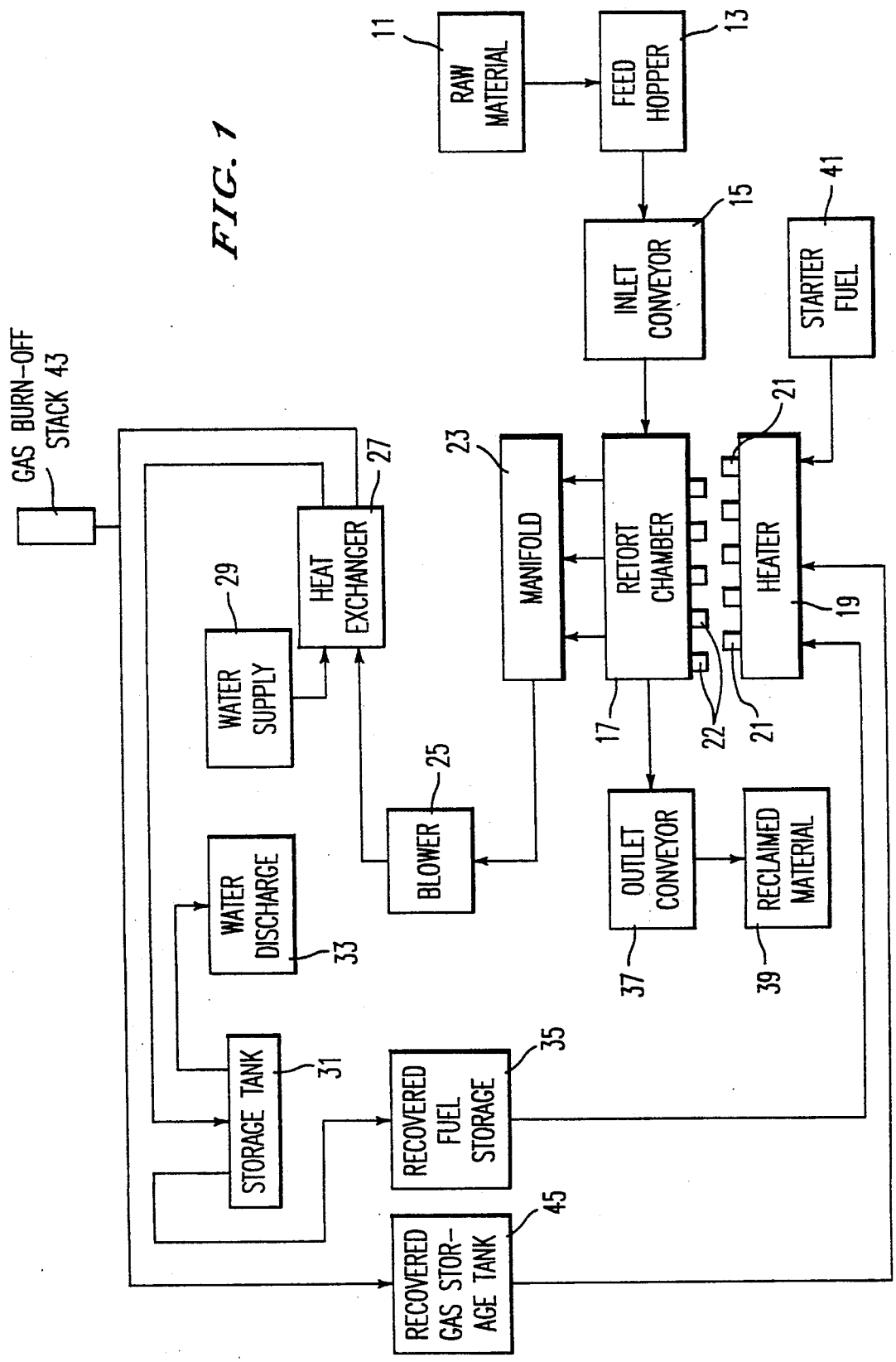
FIG. 1 is a flow diagram of the apparatus of the present invention.
Figure 2:
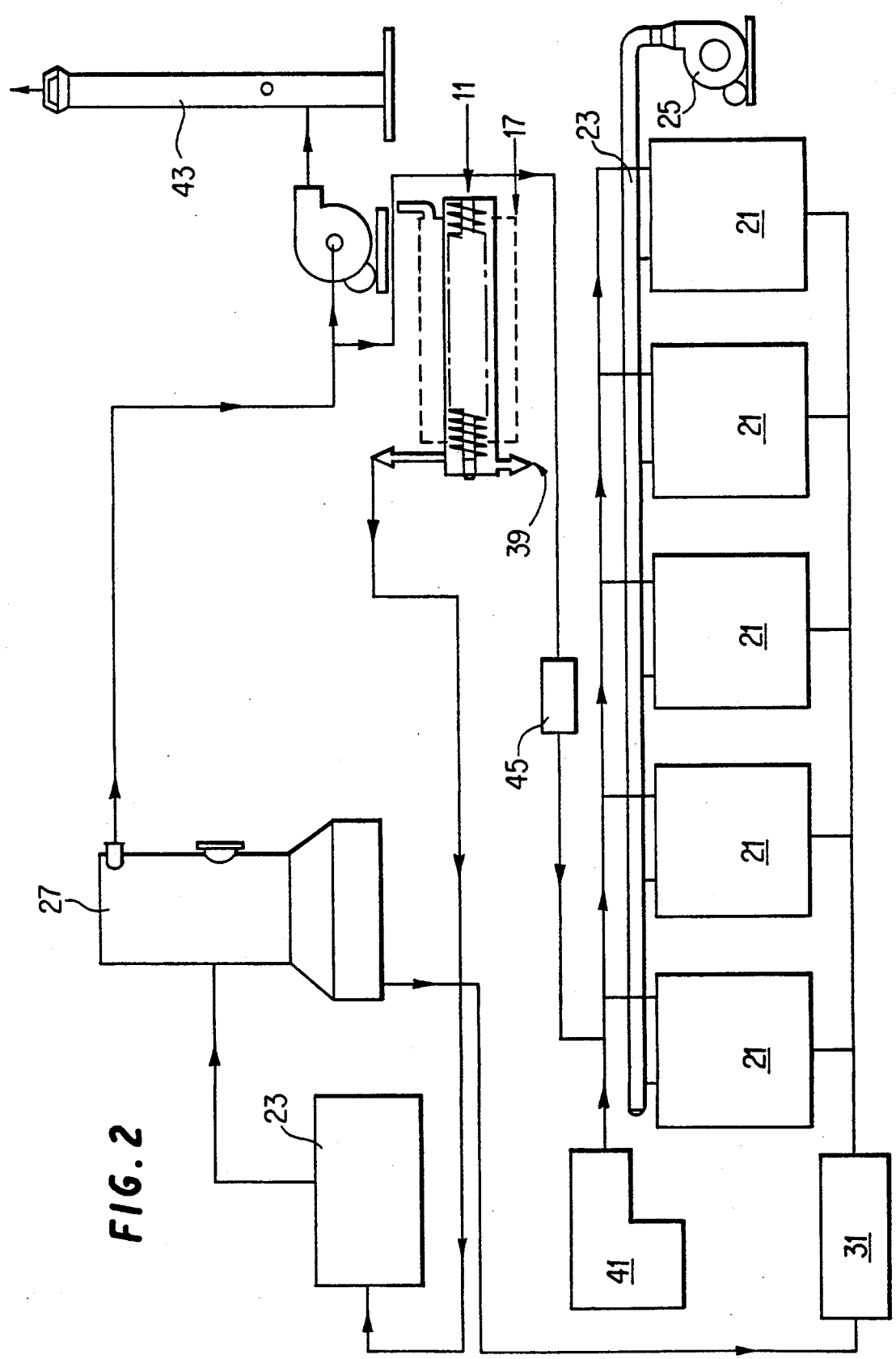
FIG. 2 is a flow diagram of the preferred embodiment of the present invention.

With reference to the figures, wherein like reference characters indicate like elements throughout the several views and, in particular, with reference to FIG. 1, there is shown a source of raw material 11, to be treated, which is first loaded into a feed hopper 13 manually or, preferably, by way of a motorized front-end loader, dump-truck, or the like. The raw material to be treated may be any solid material, wherein it is desired to remove hydrocarbons or contaminants such that the separated byproducts of the process can be separately utilized or disposed of. Some examples of such raw materials are contaminated soil, tires, automobile fluff, medical waste, batteries, asphalt, roof shingles, chicken droppings, iron oxide, gas contaminated soil, PCB in soil, tanker bottoms, drill cuttings, oil field sludge, tar sands, landfills (household garbage), and belt cake. The feed hopper 13 is preferably equipped with rotating blades to break the material into chunks, which then drop onto an inlet conveyor means 15 such as an auger conveyor. The inlet conveyor means 15 lifts or conveys the chunk material to the input end of a retort chamber means 17. The retort chamber means 17 is heated by a heater means 19. The heater means 19 includes a plurality of burners 21 spaced along the length of the retort chamber 17, with each burner 21 being capable of selective individual adjustment. The burners 21 are spaced along the length of the retort chamber 17 for directing a plurality of individual gases flames along the length thereof.

The retort chamber means 17 preferably includes a retort screw or auger that rotates inside of a stainless steel retort pipe causing the raw material 11 to be conveyed through the retort pipe to the outlet end of the retort chamber 19. The interior of the retort pipe is maintained oxygen-free by the use of airlocks in a conventional manner which will be apparent to those skilled in the art.

The heated air from the burners 21 passes through a plenum chamber to heat the retort pipe to a desired temperature which may be in excess of 1200° F. The temperature is selected to be sufficient to drive out all of the hydrocarbons from the raw material being conveyed through the retort pipe. A plurality of temperature sensors 22 are provided at spaced distances along the length of the retort chamber for sensing the temperature of the retort chamber at spaced distances along the length thereof. The gaseous flames from the burners 21 are adjusted along the length of the chamber in response to the temperature sensed by the sensors 22. The interior of the retort chamber 17 surrounding the retort pipe is lined with refractory materials such that the heat generated in the plenum chamber will be absorbed by the refractories which will then be the primary source of heat for the retort chamber pipe. The burners 21 are adjusted individually from a condition of being completely turned off to a condition of generating maximum heat, selectively and individually, so as to provide sufficient heat to the material in the retort pipe at each location therealong according to the amount of heat necessary at that position within the retort pipe needed at a particular time. The particular temperature required for treating a particular raw material depends upon the end result which is desired. For example, the temperature applied to a solid material containing hydrocarbons would depend upon the amount of hydrocarbons desired to be removed. With regard to automobile tires, the byproducts would be carbon black, oil, and methane. Depending upon the desired BTU content desired for the carbon black, the temperature must be adjusted in such a way to remove a certain portion of the hydrocarbons while leaving a certain portion of the hydrocarbons in the carbon black. The more hydrocarbons contained in the carbon black, the higher the BTU value of the carbon black byproduct. Depending upon the end use for the carbon black, and the potential economic value of each of the three byproducts, the temperature will be selected to produce each of the three end products of the process accordingly.

There is also reason for desiring a different temperature at the inlet portion of the retort chamber than at the outlet portion of the retort chamber. For example, when treating oilfield sludge which contains approximately ⅓ water, ⅓ oil, and ⅓ soil, it is necessary to remove the water in the early stages of the process before the oil can be cracked and removed from the soil. The water has to be heated to 212° F. to vaporize, and takes seven times the amount of energy to vaporize than oil. When feeding oilfield sludge through the retort chamber, the initial feed of sludge will need a higher temperature to reduce the water before the oil will start cracking. If the water remains in the sludge, it will automatically drop the bed temperature. Therefore, increasing the bed temperature at the initial burners 21 at the inlet end of the retort chamber will insure total vaporization of the water such that the remaining burners 21 at the middle and output ends of the retort chamber can be utilized for cracking the oil.

The particular settings for the temperature at any portion of the retort chamber will be in accordance with a number of variables, such as the particular raw material 11 being introduced into the process, the desired output materials including the BTU value of such materials and the economic value of each of the materials, the start-up versus steady state condition of the retort chamber, the necessity to drive off water or other selected volatiles in the initial stage of the retort process, and the flow rate of the materials through the retort chamber.

As will be described in more detail, fins are provided along the bottom of the retort pipe such that the temperature at the lower portion of the retort pipe is higher than the temperature at the upper portion of the retort pipe. The raw materials being conveyed through the retort chamber are contained in the lower portion of the retort pipe and therefore require a higher temperature applied thereto as opposed to the gaseous byproducts which are contained in the upper portion of the retort pipe.

The burners 21 are capable of operation from three distinct fuels, such as natural gas, methane and oil, which may be individually selected depending upon the availability and cost of each of the materials. For example, when treating shredded tire material, the process may be started by utilizing natural gas. However, the byproducts methane and oil from the treated automobile tire scrap material can be recycled to operate the burners once the process has begun. Therefore, the system becomes an essentially closed system utilizing its own byproducts to feed the burners and to create heat which will in turn generate more byproducts. Furthermore, the excess oil and methane from the process may be stored for resale.

As the water and hydrocarbons from the process are vaporized in the retort chamber, they are pulled away from the raw material through a manifold means 23 of a blower 25 (e.g., a typical induction draft fan). After the vapors leave the retort pipe, they are forced into a tube and shell heat exchanger 27, where condensing occurs. Water is conveyed to the heat exchanger 27 from a water supply 29. The liquid (oil and water) from the heat exchanger 27 is conveyed to a storage tank 31 and is separated. The separated water is conveyed to a water discharge 33. The separated oil is conveyed to a covered fuel storage means 35, which may be conveyed back to the heater means 21 for re-burning, or which may be stored for later disposal and/or sale.

After the hydrocarbons have been removed from the raw material to be treated, the remaining solid material is removed from the output end of the retort chamber means 17 onto an outlet conveyor means 37, which may also be a transfer auger, so as to remove the reclaimed solid material for resale and/or disposal.

A starter fuel such as natural gas 41 is utilized to initially burn in the burners 21 to begin the process until sufficient byproducts are generated in the retort chamber to be recycled to the burners, after which the starter fuel would be discontinued. The gaseous products from the heat exchanger 27 may be flared or burned-off through a gas burn-off stack 43 or may be recovered in a gas storage tank 45. The recovered gas in storage tank 45 can be fed back to the heater means 19 to be burned in burners 21.

Figure 3:
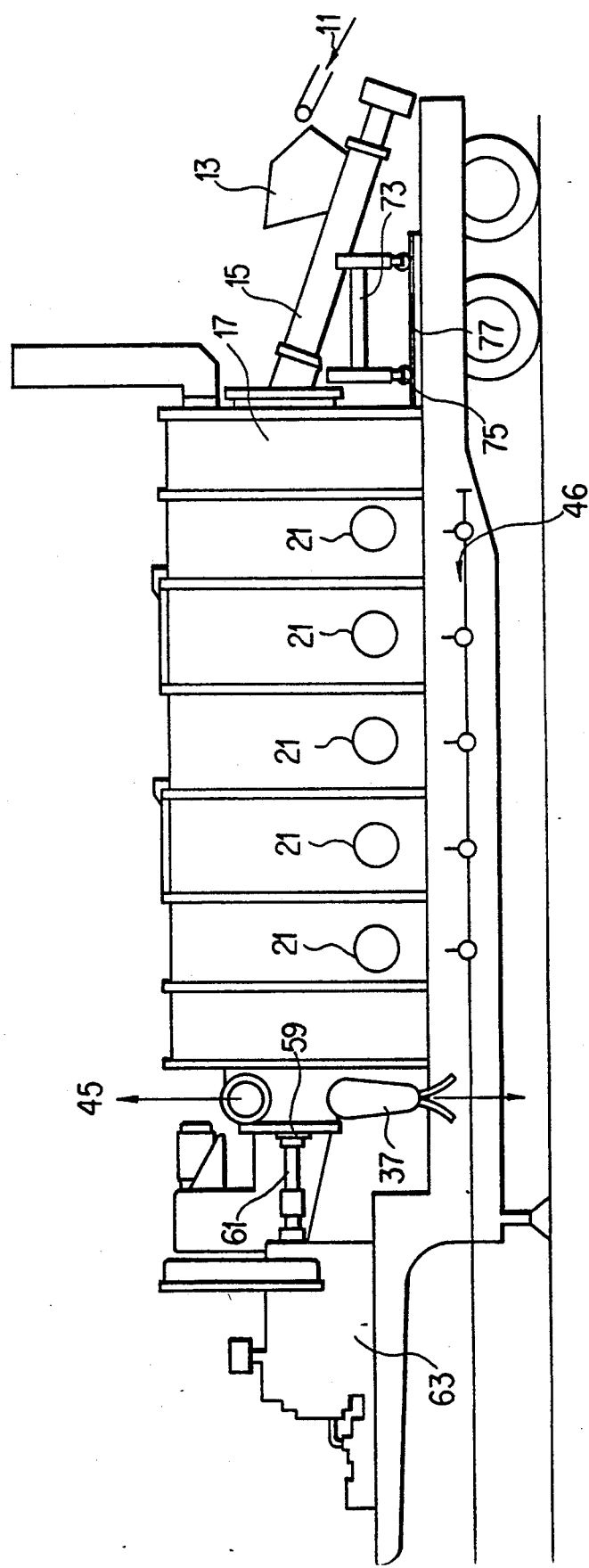
FIG. 3 is a side plan view of the exterior of the apparatus of the present invention.

As shown in FIG. 3, the entire apparatus, as described, can be completely mounted on a flatbed truck 46 so as to be movable from location to location. The only additional materials to be supplied at a particular location would be storage tanks for the reclaimed materials, and equipment for loading the raw material 11 into the hopper 13.

Referring now to FIGS. 4 through 7, wherein details of the mechanism are more clearly illustrated, there is shown a truck bed 46 upon which the entire apparatus is assembled such that it may be easily brought upon a site wherein the raw materials to be treated are located. The retort chamber means 17 rest upon the truck bed 46 and may be securely fastened thereto by conventional means. The interior of the retort chamber means 17 are lined with refractory material 47. The flames from the burners 21 heat the air in the plenum chamber 49, which in turn heats the refractory material 47 to radiantly heat the retort pipe 51 which is constructed of stainless steel or other suitable heat conducting material. Fins 53 are provided along the lower portion of retort pipe 51 for assuring a higher temperature in the lower portion of the retort pipe 51 than in the upper portion thereof. A retort auger conveyor 55 is journaled in bearings 57 and 59 at the inlet and outlet portions, respectively, of the retort pipe 51. The retort auger conveyor 55 is rotated by means of a drive shaft 61 which is rotated by conventional power means 63. The retort auger conveyor 55 is located adjacent the lower portion of the retort pipe 51 so as to leave a space 65 between the retort auger conveyor 55 and the upper portion of the retort pipe 51 for easy passage and removal of gases generated during the process. Furthermore, the space 65 allows for thermal expansion of the metallic parts, which will occur during the heating process.

Figure 4:
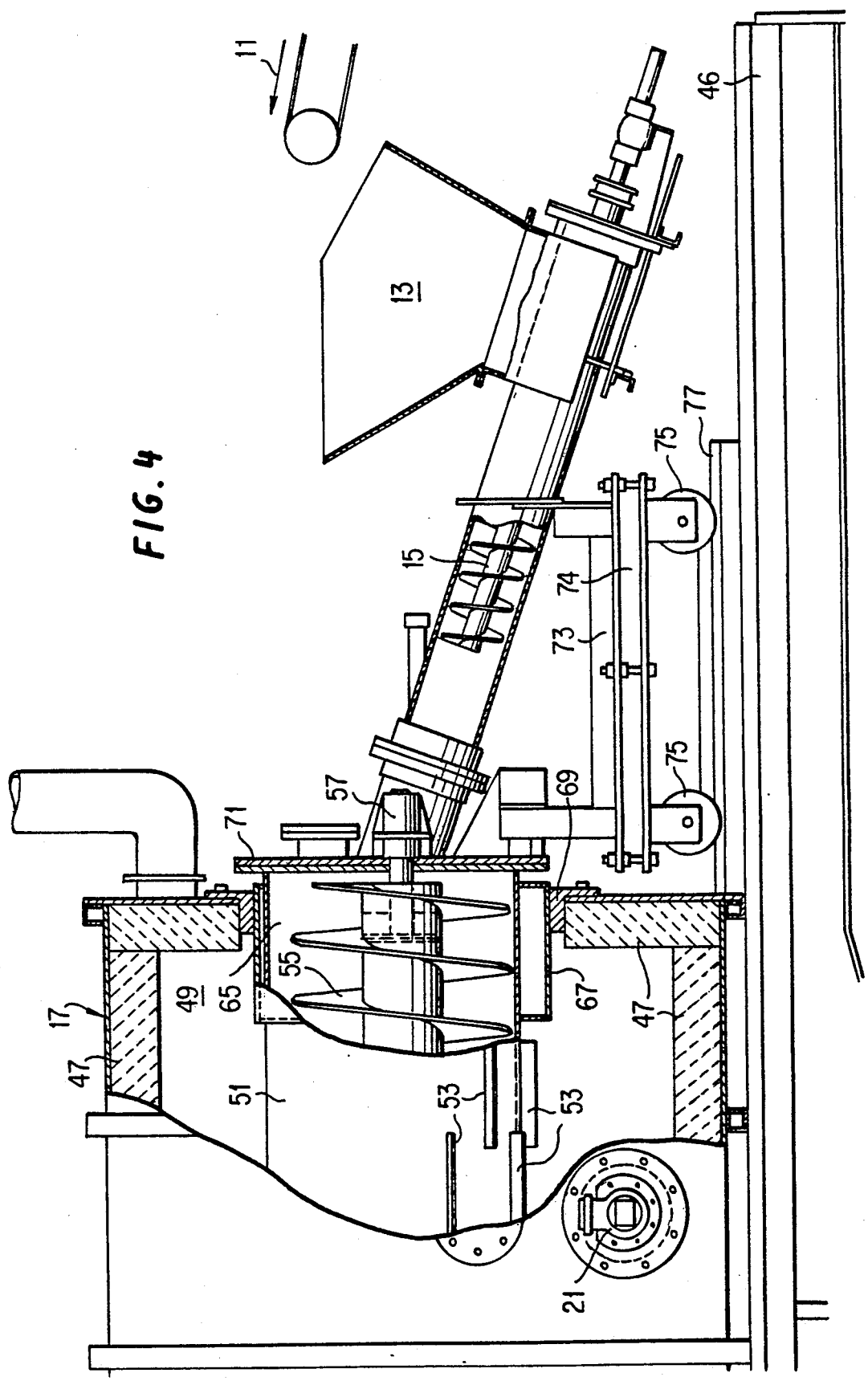
FIG. 4 is a side view of the inlet portion of the mobile apparatus of the present invention.
Figure 5:
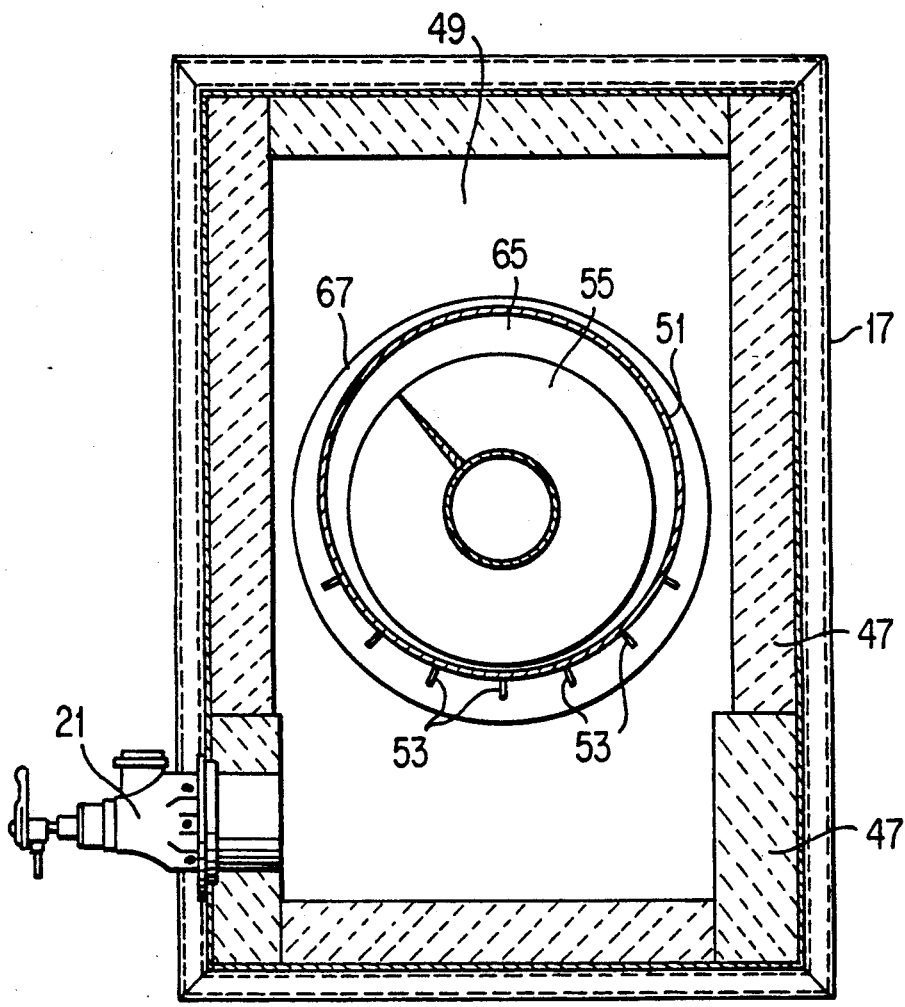
FIG. 5 is a partial cutaway end view of the retort chamber of the present invention.
Figure 6:
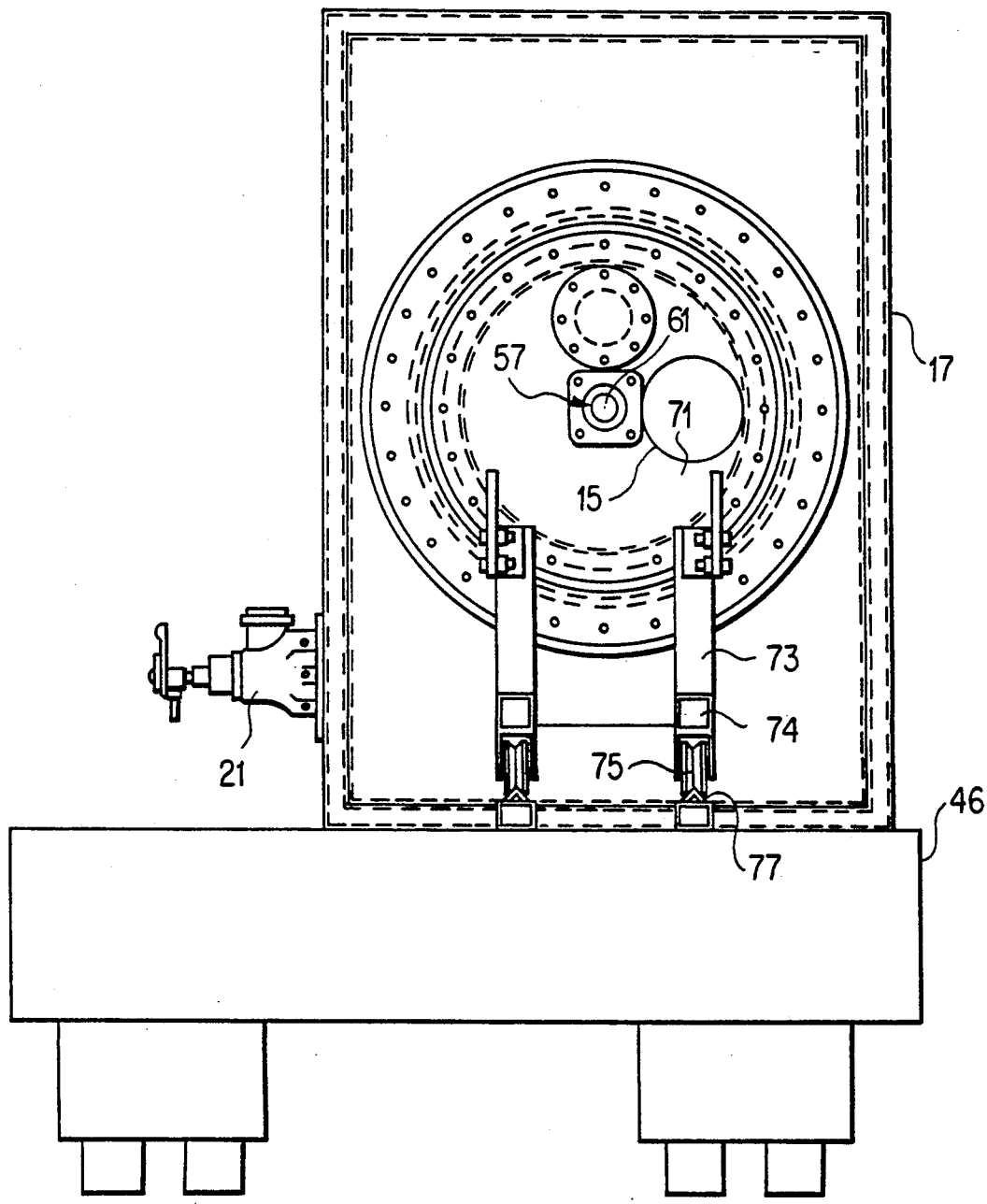
FIG. 6 is a partial end plan view of the inlet portion of the apparatus of the present invention.
Figure 7:
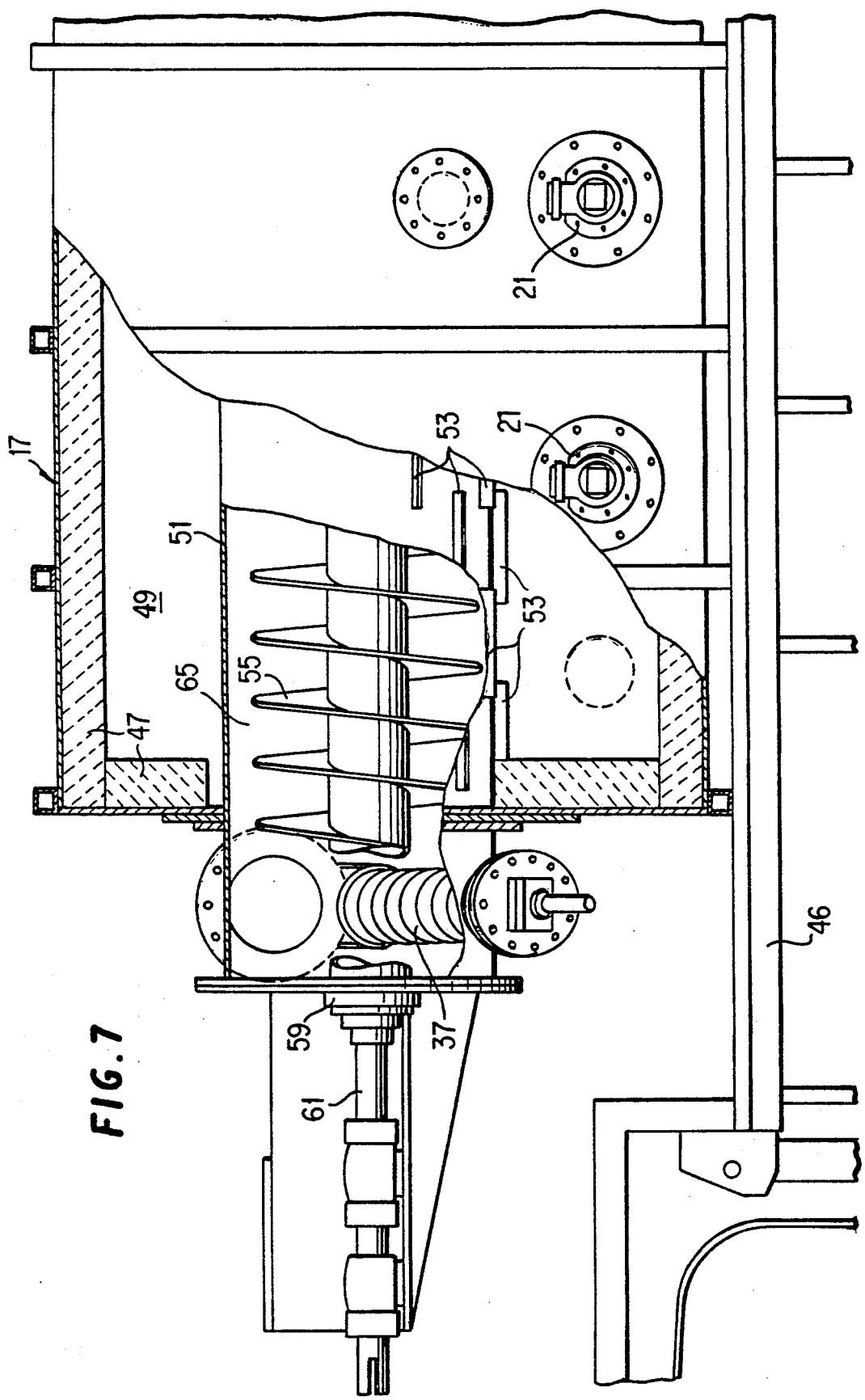
FIG. 7 is a partial side view of the outlet portion of the retort chamber of the present invention.

Referring now to FIGS. 3, 4 and 6, details of the inlet portion of the retort chamber means 17 are shown. The retort pipe 51 has a circumferential flange member 67 affixed thereto, which is slidably mounted in a circumferential seal 69. The seal 69 is affixed to the retort chamber means 17 such that the circumferential flange member 67 can axially slide along the seal 69 allowing for thermal expansion of the retort auger conveyor 55, the retort pipe 51, and other metallic parts being heated. The inlet conveyor means 15, feed hopper 13, and associated inlet feed equipment are fixedly attached to the outer end wall 71 of the inlet portion of the retort pipe 51. A frame member 73 is affixed to the outer end wall 71, the inlet conveyor means 15 and other inlet supported equipment, and is mounted on a base 74 having wheel members 75 which ride upon tracks 77 mounted on the truck bed 46. In this manner, as the retort chamber means 17 heats the retort pipe 51, retort auger conveyor 55 and associated equipment, the thermal expansion of the metallic parts will cause elongation in the axial direction. As the metallic parts expand, the retort pipe 51 will axially move in the direction of the inlet portion such that circumferential flange member 67 will slide along seal 69. The inlet conveyor means 15, feed hopper 13, and associated inlet equipment which are fixedly attached to the movable frame member 73 will slide along the tracks 77 mounted on the truck bed.

As can be seen from the foregoing description, a retort system has been described which can have all of the essential components thereof mounted upon a truck bed to be brought upon a location having contaminated or waste products and wherein the waste products can be converted to end products which can be recycled or disposed of without creating any damaging effects to the ecology. The solid, liquid and gaseous byproducts of the process can be removed in storage containers. Excess gas can be flared, on site, if such gases do not produce products harmful to the atmosphere. Furthermore, oil and burnable gas which may be byproducts of the process can be recycled to the apparatus to create an essentially closed system which does not need auxiliary fuel except in the start-up period. The burners in the heater means can be individually controlled by heat sensors and can be selectively adjusted depending upon conditions desired. The system can be adapted to produce byproducts in a most desirable state depending upon the economic value of each of the byproducts and the intended end use of each of the byproducts.

Although the present invention has been fully described in connection with the preferred embodiment thereof with reference to the accompanying drawings, it is to be noted that various changes and modifications are apparent to those skilled in the art. Such changes and modifications are to be understood as included within the scope of the present invention as defined by the appended claims, unless they depart therefrom.

What is claimed is:

1. Apparatus for allowing thermal dimensional changes of metal parts in a retort mechanism comprising:

a retort chamber, a retort pipe axially extending within said retort chamber and having a material inlet and outlet portion;

a retort auger axially extending from said inlet portion to said outlet portion of said retort pipe;

said retort pipe having an outer end wall at said inlet end thereof;

said retort auger being fixed to said outer end wall so as to be rotatable within said retort pipe;

said retort pipe, said retort auger and said outer end wall being mounted so as to be axially slidable within said retort chamber in response to thermal expansion; and a circumferential seal mounted on said retort chamber and in contact with said retort pipe so as to maintain a sealing relationship during said axial sliding.

2. Apparatus according to claim 1, wherein a circumferential flange is fixedly attached to said retort pipe and is disposed between said retort pipe and said circumferential seal.

3. Apparatus according to claim 1 further comprising an inlet conveyor means fixedly attached to said outer end wall of said retort pipe.

4. Apparatus according to claim 3, further comprising:

a frame member fixedly attached to said retort pipe outer end wall and said inlet conveyor means.

5. Apparatus according to claim 4, wherein said frame member includes wheel members.

6. Apparatus according to claim 5, wherein a feed hopper is fixedly attached to said inlet conveyor means.

7. Apparatus according to claim 6, wherein said wheel members rest upon and ride on tracks such that during thermal expansion of the retort pipe and retort auger conveyor, said inlet conveyor means, said feed hopper and the outer end wall of said retort pipe are all interconnected with said frame member and are capable of axial movement in response to thermal expansion of said retort auger.

8. Apparatus according to claim 7, wherein said retort chamber and said track means are mounted on a truck bed.

* * * * *